United States Patent [19]

Krüger

[11] 4,094,419
[45] June 13, 1978

[54] HANDLING PLANT FOR DUMPING AND DISCHARGING BULK MATERIALS

[75] Inventor: Rolf Krüger, Lubeck, Germany

[73] Assignee: O and K Orenstein & Koppel Aktiengesellschaft, Germany

[21] Appl. No.: 731,669

[22] Filed: Oct. 12, 1976

[30] Foreign Application Priority Data

Oct. 18, 1975  Germany ............................ 2546757

[51] Int. Cl.$^2$ ........................................... B65G 65/28
[52] U.S. Cl. ..................................... 214/10; 198/508; 214/17 C; 214/17 DB
[58] Field of Search ............... 198/366, 370, 372, 508, 198/509, 585; 214/10, 14, 16 R, 17 C, 17 CA, 17 DB

[56] References Cited

U.S. PATENT DOCUMENTS

| 3,435,967 | 4/1969 | Sackett | 214/17 CA |
| 3,471,041 | 10/1969 | Parsons | 214/17 C |

FOREIGN PATENT DOCUMENTS

| 255,563 | 12/1926 | Italy | 214/16 R |

*Primary Examiner*—Drayton E. Hoffman
*Assistant Examiner*—George F. Abraham

*Attorney, Agent, or Firm*—McGlew and Tuttle

[57] ABSTRACT

A handling plant for dumping and discharging bulk material into or from a pile, comprises a loading bridge which is adapted to span or be moved over the pile, and which includes an upper beam having a first trackway and a lower beam having a second trackway which extends longitudinally of the bridge and which are adapted to span the storage space or pile. The dumping gear includes a first trolley which is movable along the first trackway and has a conveyor system for receiving the bulk material and for transferring it to each side of the bridge and for dumping it downwardly into a discharge tube. A removing gear which comprises a second trolley which is movable along the second trackway has a vertically extending conveyor with pickup elements, such as, buckets or similar means, to pick up the bulk material vertically and to transfer it to a bridge conveyor which extends longitudinally along the trackway. The bridge advantageously includes an outer cantilever portion with a pile pickup conveyor which may be manipulated to position the end in the pile to feed the material upwardly through a feeder and into a discharge gear and a lower conveyor which extends upwardly from the bridge conveyor to discharge the material from the bridge conveyor into the pile.

9 Claims, 2 Drawing Figures

HANDLING PLANT FOR DUMPING AND DISCHARGING BULK MATERIALS

FIELD AND BACKGROUND OF THE INVENTION

This invention relates in general to bulk material handling devices and, in particular, to a new and useful handling plant for dumping and discharging bulk materials which includes a bridge member which is advantageously supported on a trackway for movement over a storage space adjacent a pile for the purposes of picking up the material and delivering it to the pile and which also includes means for removing material from the pile and delivering it to a discharge location.

The present invention relates particularly to a handling plant for dumping and discharging bulk material into or from a pile and includes a loading bridge which is movable over and spans the pile on which bulk conveyors are supported and which also carries a removing and dumping gear on trolleys which are movable along the support beams of the bridge in defined trackways. A known device of this type includes one for discharging bulk material from a dumped pile and which comprises a bridge structure with a horizontal girder spanning the pile and which is adapted to travel thereover. A trolley is mounted for moving along the girder. The trolley includes a transverse projecting at both sides of the girder and carrying a supporting frame secured thereto, on which a jib is pivotally mounted. The jib carries a bulk material removing gear at its end. A conveyor is mounted in the job for discharging the bulk material taken up by the removing gear, and this is followed by an elevator mounted in the girder, by which the material is transferred onto a belt conveyor extending along and supported on the bridge. For the purpose of dumping the bulk material in the loading space, the device comprises a second trolley which is movable on the same rails as the trolley for the removing gear and it carries an ejector. To dump the material, the material is fed to the ejector by the belt conveyor supported on the bridge. With this device of the prior art, bulk material can be dumped in or discharged from a pile. However, the two operations cannot be effected simultaneously. At any reversal of the operation, the respective eliminated gear must be moved to the end of the bridge (German Auslegeschrift 1,756,635).

Another known device is a traveling bridge for dumping and removing bulk material in and from piles, in which bucket-wheel conveyor jibs, each reaching up to the middle of the bridge, are pivotally mounted at fixed locations in the zone of the bridge supports. The bucket-wheel jibs are pivotable about horizontal axes and mounted on swing columns which are rotatable about their vertical axes. Cable lines attached to booms which are connected to the swing columns are provided for lifting and lowering the bucket-wheel jibs. To supply and discharge the material, the bucket-wheel jibs are followed by belt conveyors which transfer the material to a main conveyor. For both the dumping and removing of material in and from piles, an additional, horizontally and vertically pivotable dumping belt, which receives the material from the supply belts, is mounted in the center of the bridge girder. The disadvantage of this device is the necessity of providing two bucket-wheel jibs, each of which is capable of receiving or dumping material only at one side of the pile and to a limited extent, (German Auslegeschrift 1,141,591).

SUMMARY OF THE INVENTION

The present invention is directed to a device for handling bulk material which avoids the drawbacks of the prior art and comprises only a single removing gear. In addition, it includes simple means to remove bulk material from one storage place and, simultaneously, and independently thereof to dump another bulk material, while permitting removal and dumping of both materials over the entire width of the pile. Further, the construction of the handling plant has to be as simple as possible and weight-saving. Also, the control of the handling plant has to be simple.

In accordance with the invention, the removing gear and the dumping gear are mounted on two separate tracks for traveling independently of each other along the entire length of the loading bridge. The invention has the advantage that an uninterrupted and uniform removal of the piled material and a simultaneous loading of the storage place over the entire width of the pile are ensured so that idle periods are eliminated. The handling plant is simple in construction and its operation is economical and easy to follow.

In an advantageous embodiment, the track for the removing gear is mounted above or below the track for the dumping gear. In another embodiment, the tracks for both the removing and the dumping gear are provided at the same level. If an operation of the handling plant in both longitudinal directions of the pile is provided, the dumping gear is equipped, according to a further embodiment of the invention, with a reversible cross-belt conveyor terminating at either side of the loading bridge. In another development of the invention, for a circular shape of the storage place, the loading bridge carries on its end supply and discharge belt, conveyors which are pivotable about vertical and horizontal axes. To ensure satisfactory and uniform removal and dumping of material from and into piles, the belt conveyors of the removing and dumping gears may be provided with measuring devices for the rate of flow, controlling interdependently the feed and discharge of bulk material to and from the storage place.

Accordingly, it is an object of the invention to provide a handling plant for dumping and discharging bulk material from a pile which includes a loading bridge which is adapted to span and to be moved over the pile and which has first and second support beam portions extending longitudinally of the bridge which have respective first and second trackways thereon with a dumping gear comprising a first trolley which is movable along the first trackway and has conveyor means for receiving the bulk material and dumping it downwardly and which also includes a removing gear comprising a second trolley movable along the second trackway and including conveyor means for picking up the bulk material and for transferring it to another conveyor for delivery into the pile.

A further object of the invention is to provide a handling plant which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figure 1:
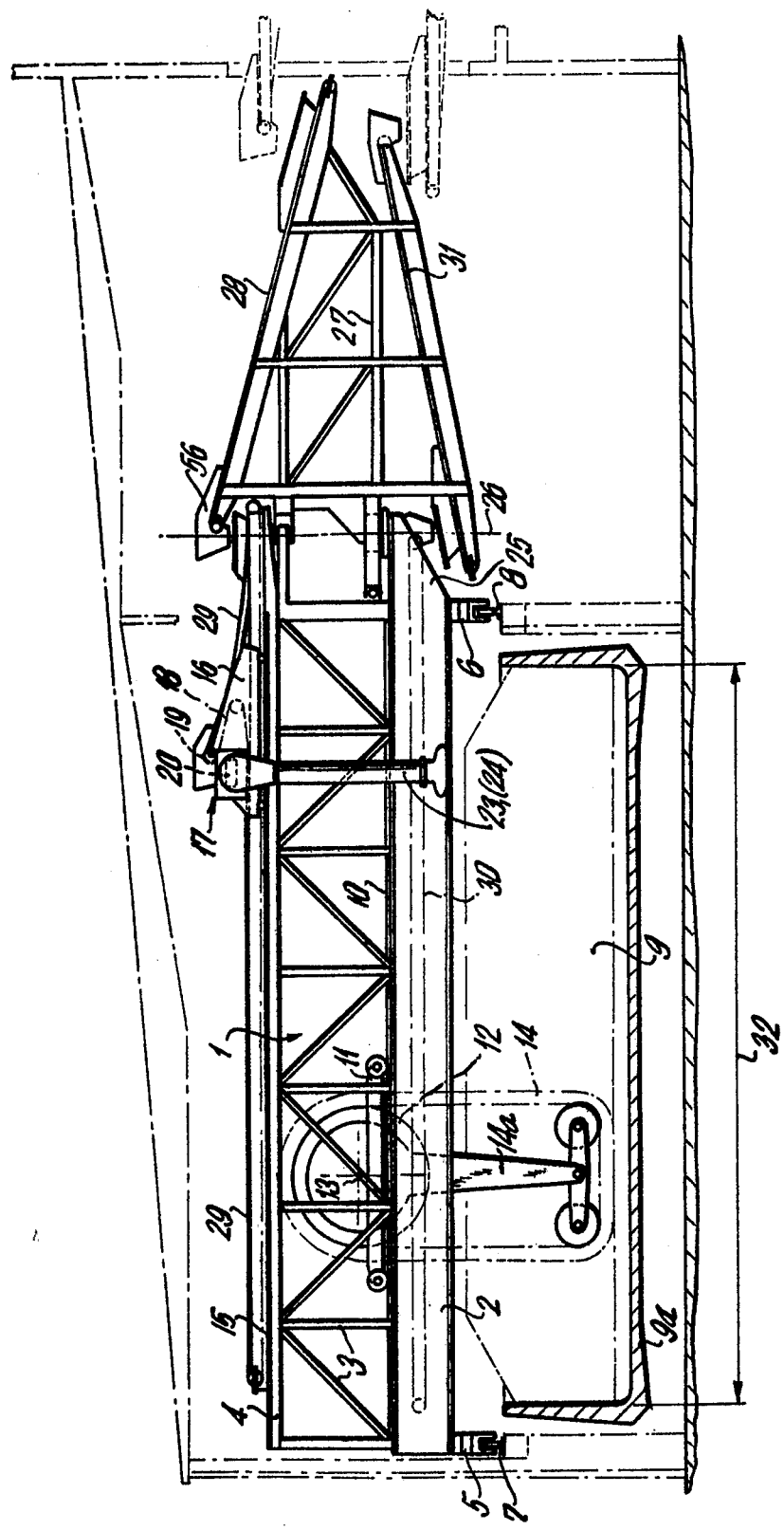
FIG. 1 is a side elevational view of a loading bridge constructed in accordance with the invention.
Figure 2:
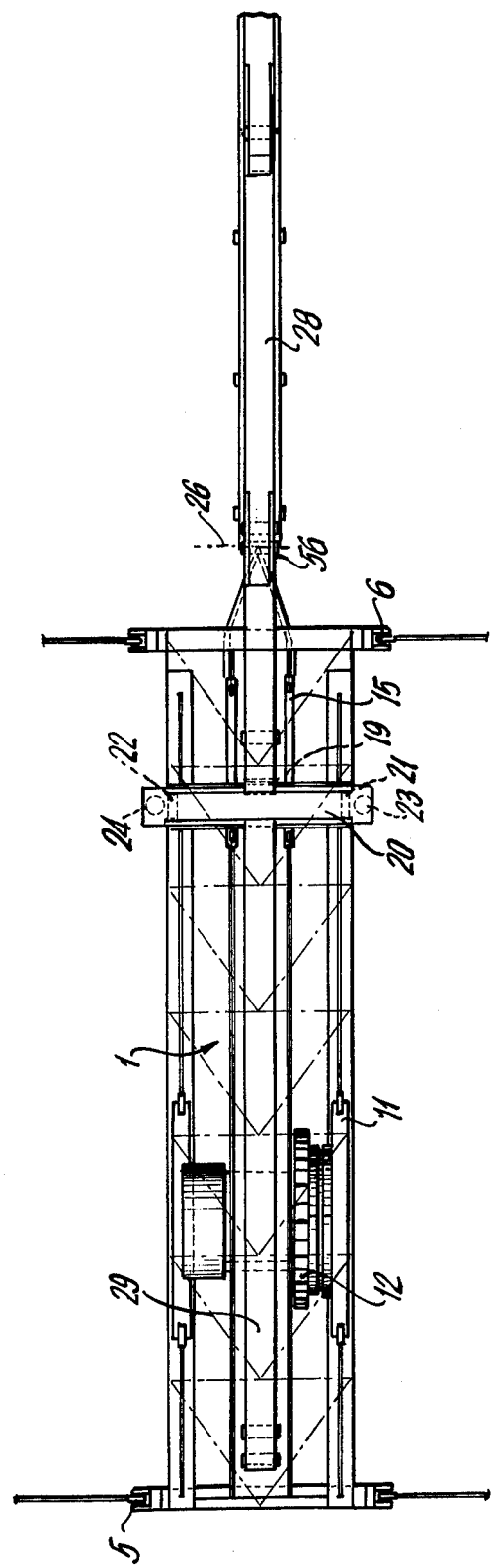
FIG. 2 is a top plan view of the device shown in FIG. 1.

Referring to the drawing in particular, the invention embodied therein, comprises a handling plant for dumping and discharging bulk material into or from a pile and which comprises a loading bridge, generally designated 1, which includes a first or upper beam 4 having a first trackway portion 15 thereon along which a dump gear, generally designated 17, is movable, and a lower beam 2 having a trackway portion 10 along which a removing gear 12 is movable in the longitudinal direction of the bridge structure. Upper beam 4 and lower beam 2 comprise box beams which are interconnected by means of struts 3.

Loading bridge 1 is supported on rails 7 and 8 by means of undercarriages 5 and 6, respectively. The loading bridge is indicated as spanning a storage space 9 of a container or hopper 9a. Such a storage space may be of any geometric configuration including rectangular or circular.

In accordance with a feature of the invention, the removing gear 12 includes a trolley 11 which travels along the track 10 in the longitudinal direction of the loading bridge 1. The removing gear 12 also includes a pivotal support lever structure 14a having sprocket guide wheels for a vertical conveyor 14 which may be pivoted about a horizontal axis 13 so that buckets or other pickup devices associated with the conveyor may be oriented in respect to the storage space or lifted upwardly therefrom when necessary. In addition, when it is necessary to move the bridge over the top of a pile, the vertical conveyor can be swung upwardly about its horizontal axis 13 and then brought into a new initial position.

In accordance with another feature of the invention, a dumping gear 17 includes a trolley 16 which travels along the trackway 15. Trolley 16 carries a conveyor belt 19 which provides a pickup and transfer conveyor which feeds the bulk material over a discharge drum 19 and onto a cross-conveyor 20. Conveyor 20 comprises a cross-belt conveyor which is reversible and it is guided over discharge pulleys or drums 21 and 22 which project beyond the width of the loading bridge 1. Telescopic discharger tubes 23 and 24 extend downwardly from the respective outer discharger ends of the cross-conveyor 20 and these tubes are provided with baffle plates for guiding the bulk material.

In accordance with another feature of the invention, and end portion of the bridge at the location 25 supports a cantilever structure 27 which may be pivoted about a vertical axis 26. The pile pickup conveyor 28 is mounted on the top side of the cantilever structure 27 and picks up material at its one outer lower end and delivers it upwardly into a feeder 56 for transfer to the conveyor 29 associated with the belt 18 and the material is passed over this conveyor and the discharge drum 19 to the cross-conveyor 20 and through discharge tube 23 or 24 to the storage place.

If a pile is to be removed from storage place 9, the material is taken up by a vertical conveyor 14 and delivered through the appropriate transfer devices (not shown), to a bridge belt 30. Bridge belt 30 is trained to run along the beam 2 and it is positioned to deliver material to a discharge belt 31 which is picked up by the vertical conveyor 14. The discharge belt 31 is mounted at the lower end of the cantilever structure 27 and it is positioned to extend obliquely upwardly from the lower end which is adjacent the discharge end of the conveyor bridge belt 30.

If a conveyor flight, which is not shown, is arranged along the storage space 9, the cantilever structure 27 and conveyors 28 and 31 may be omitted. In such a case, the material to be dumped may be supplied to conveyor 29 by a belt conveyor, which is not shown, but which extends in a direction of the plant and the removed material may be received from the bridge conveyor 30 by a conveyor, which has not been shown, which also extends in the longitudinal direction of the plant.

After removal of an aisle or area from the storage place 9, along its entire width 32, the handling plant bridge conveyor 30 can be instantly used for dumping another bulk material in the cleared space. Thus, a simultaneous removal and dumping of bulk material is made possible in a single operation. Another possible method of simultaneous removal and dumping is, for example, to remove one half of the pile width 32 in the traveling direction of loading bridge 1 and, in a second operation, to dump new material in the space thus cleared and simultaneously remove the other half of the pile in the longitudinal traveling direction.

In any operation, removing gear 12 and dumping gear 17 can be moved along the entire length of the bridge independently of each other. In order to obtain a uniform dumping and removal of piles, the conveyors of both gears 12 and 17 may be coupled together so that the transported amount of material of dumping gear 17 does not exceed that of removing gear 12, and conversely. Further, because of the simple, straightforward arrangement of the removing and dumping gears, the inventive handling plant makes it possible to provide an automatic control both for the combined removing and dumping operation and for individual operations in a single direction.

While a specific embodiment of the invention has been shown and described in detail to illustrate the application of the principles of the invention, it will be understood that the invention may be embodied otherwise without departing from such principles.

What is claimed is:

1. A handling plant for dumping and discharging bulk material into or from a pile, comprising only one loading bridge adapted to span and be moved over the pile, said bridge having first and second support beam portions extending longitudinally of said bridge, each having a respective first and second trackway thereon, a dumping gear comprising a first trolley movable along said first trackway and having conveyor means for receiving the bulk material and for dumping it downwardly, and a removing gear comprising a second trolley movable along said second trackway, a support depending from said second trolley with a pivoted arm member at its lower end, a roller guide at each end of said arm member and a conveyor entrained about said support and arm member, said removing gear and said dumping gear being capable of independent and combined operation over one area of the pile.

2. A handling plant, according to claim 1, wherein said first and second support beams in the associated first and second trackways are vertically spaced apart.

3. A handling plant, according to claim 1, wherein said dumping gear includes a reversible cross-belt conveyor extending transversely of said loading bridge and having a discharge end at each side thereof.

4. A handling plant for dumping and discharging bulk material into or from a pile, comprising only one loading bridge adapted to span and be moved over the pile, said bridge having first and second support beam portions extending longitudinally of said bridge, each having a respective first and second trackway thereon, a dumping gear comprising a first trolley movable along said first trackway and having conveyor means for receiving the bulk material and for dumping it downwardly, and a removing gear comprising a second trolley movable along said second trackway and including second conveyor means for picking up the bulk material, said removing gear and said dumping gear being capable of independent and combined operation; a cantilever structure pivoted to said support beam adjacent one end thereof, a pile pickup conveyor disposed at the top of said cantilever structure in a position to feed the bulk material from one end to said dump gear first conveyor means, said cantilever structure being pivotal about a vertical axis.

5. A handling plant, according to claim 4, wherein said first and second conveyor means have material flow measuring devices for controlling the supply and discharge of the bulk material.

6. A handling plant for dumping and discharging bulk material into or from a pile, comprising a loading bridge adapted to span and move over the pile and including upper and lower vertically spaced beams having respective first and second trackways thereon extending in the longitudinal direction of said bridge, a dumping gear comprising a first trolley movable along said first trackway having a receiving conveyor portion with a discharge end, a cross-belt conveyor carried by said dumping gear for receiving the conveyor material from said receiving conveyor and having a discharge at at least one end, a discharge chute extending downwardly from said one end of said cross-belt conveyor, a pile pickup conveyor extending upwardly from a pickup end to said receiving conveyor and having a discharge end overlying said receiving conveyor for delivering material thereto, a removing gear comprising a trolley movable along said second trackway, said removing gear including a vertical conveyor including a pivotal arm member pivotable about a horizontal axis and having guide roller means supported at the outer end of said arm member, a vertical conveyor trained around said arm member in said guide roller means and having means for picking up bulk material during movement thereof, a bridge conveyor extending along said lower support beam in a position to receive material from said vertical conveyor and deliver it longitudinally at its outer end thereof, and a pile delivery conveyor located to receive material from the bridge conveyor.

7. A handling plant according to claim 6, wherein said cross-belt conveyor is reversible and has a discharge end at each side extending over a side of said bridge construction, said discharge chute is telescopic and there is a similar discharge chute connected to the other end of said cross-belt conveyor discharge.

8. A handling plant, according to claim 7, including bridge track means extending transversely of said bridge, said bridge having an undercarriage movable along said bridge track means.

9. A handling plant, according to claim 6, including a cantilever structure pivotally mounted on said bridge for pivotal movement about a vertical axis, with the pile pickup and pile delivery conveyors mounted on said cantilever structure.

* * * * *

UNITED STATES PATENT OFFICE
CERTIFICATE OF CORRECTION

Patent No. 4,094,419          Dated June 13, 1978

Inventor(s) Rolf Krüger

It is certified that error appears in the above-identified patent and that said Letters Patent are hereby corrected as shown below:

On the cover sheet Assignee should read.

-- (73) O&K Orenstein & Koppel Aktiengesellschaft Werk Lübeck --.

Signed and Sealed this

Twentieth Day of March 1979

[SEAL]

Attest:

RUTH C. MASON
*Attesting Officer*

DONALD W. BANNER
*Commissioner of Patents and Trademarks*